US009489380B2

(12) United States Patent
Piersol et al.

(10) Patent No.: US 9,489,380 B2
(45) Date of Patent: Nov. 8, 2016

(54) METHODS AND APPARATUS FOR MANAGEMENT OF UNCONSCIOUSLY CAPTURED DOCUMENTS

(75) Inventors: Kurt W. Piersol, Santa Cruz, CA (US); Bert Rankin, Los Altos, CA (US); Mark Minshull, Los Gatos, CA (US); Tony Hammer, Saratoga, CA (US)

(73) Assignee: RICOH CO., LTD., Tokyo (JP)

( * ) Notice: Subject to any disclaimer, the term of this patent is extended or adjusted under 35 U.S.C. 154(b) by 1751 days.

(21) Appl. No.: 11/365,331

(22) Filed: Feb. 28, 2006

(65) Prior Publication Data

US 2006/0149722 A1 Jul. 6, 2006

Related U.S. Application Data

(63) Continuation of application No. 09/571,163, filed on May 15, 2000, now Pat. No. 7,039,864.

(51) Int. Cl.
| | |
|---|---|
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |

(Continued)

(52) U.S. Cl.
CPC .. *G06F 17/30011* (2013.01); *Y10S 707/99933* (2013.01); *Y10S 707/99953* (2013.01)

(58) Field of Classification Search
CPC .......... G06F 17/2247; G06F 17/3089; G06F 17/30899; G06F 17/30067; G06F 11/1464; G06F 17/24; G06F 17/30; G06F 17/30011; G06F 17/30247; G06F 17/3011

USPC .......... 715/234, 255, 229; 707/204, 999.003, 707/999.202, 999.204, E17.008; 358/403
See application file for complete search history.

(56) References Cited

U.S. PATENT DOCUMENTS 5,704,060 A * 12/1997 Del Monte .................. 715/234
5,761,675 A    6/1998 Isenberg ..................... 707/200

(Continued)

OTHER PUBLICATIONS

Ramana Rao, Protofoil: storing and finding the information worker's paaper documents in an electronic file cabinet, ACM Press, 1994, pp. 180-185.

*Primary Examiner* — Manglesh M Patel
*Assistant Examiner* — Nicholas Hasty
(74) *Attorney, Agent, or Firm* — Blakely, Sokoloff, Taylor & Zafman LLP

(57) ABSTRACT

Methods and apparatuses for management of unconsciously captured documents are described. Various documents generated by networked devices are unconsciously captured and stored according to a non-semantic organization. The unconsciously captured documents are archived for possible search and retrieval at a later time. When an event occurs (e.g., lawsuit, audit, change in ownership) that results in a desire for a particular subset of the unconsciously captured documents, the documents are searched for a relevant subset. The subset of documents identified by the search are copied and stored according to a second organization (e.g., subject matter, particular audit). In one embodiment, subsequent unconsciously captured documents are stored according to the first organization. If the subsequent documents satisfy the criteria for the subset of documents, the subsequent documents are copied and stored according to the second organization.

20 Claims, 5 Drawing Sheets

(51) Int. Cl.
*G06F 17/27* (2006.01)
*G06F 17/28* (2006.01)
*G06F 17/30* (2006.01)

(56) References Cited

U.S. PATENT DOCUMENTS

| | | | | |
|---|---|---|---|---|
| 5,764,972 A | * | 6/1998 | Crouse et al. | 707/999.202 |
| 5,832,100 A | * | 11/1998 | Lawton et al. | 382/100 |
| 5,832,474 A | * | 11/1998 | Lopresti et al. | 707/999.002 |
| 5,893,908 A | * | 4/1999 | Cullen et al. | 715/210 |
| 5,924,074 A | | 7/1999 | Evans | 705/3 |
| 5,978,477 A | * | 11/1999 | Hull | G06Q 99/00 |
| | | | | 358/403 |
| 6,014,681 A | * | 1/2000 | Walker et al. | 715/234 |
| 6,115,509 A | * | 9/2000 | Yeskel | G06F 17/30017 |
| | | | | 382/309 |
| 6,237,011 B1 | | 5/2001 | Ferguson et al. | 715/515 |
| 6,418,463 B1 | * | 7/2002 | Blevins | G06Q 10/10 |
| | | | | 709/202 |
| 6,487,558 B1 | * | 11/2002 | Hitchcock | 707/999.202 |
| 6,549,638 B2 | | 4/2003 | Davis et al. | 382/100 |
| 6,592,629 B1 | * | 7/2003 | Cullen et al. | 715/205 |
| 6,611,840 B1 | | 8/2003 | Baer et al. | 707/102 |
| 6,638,313 B1 | | 10/2003 | Freeman et al. | 715/500.1 |
| 6,640,239 B1 | * | 10/2003 | Gidwani | 709/203 |
| 6,665,679 B2 | * | 12/2003 | Curtis et al. | 707/999.1 |
| 6,678,705 B1 | * | 1/2004 | Berchtold et al. | 707/999.204 |
| 6,748,425 B1 | * | 6/2004 | Duffy et al. | 709/217 |
| 6,810,404 B1 | * | 10/2004 | Ferguson | G06F 17/30011 |
| | | | | 707/999.005 |
| 6,826,593 B1 | | 11/2004 | Acharya et al. | 709/203 |
| 6,850,519 B1 | * | 2/2005 | Saito et al. | 370/389 |
| 7,130,807 B1 | * | 10/2006 | Mikurak | 705/7.25 |
| 7,299,412 B1 | * | 11/2007 | Hull | G06F 17/30286 |
| | | | | 707/E17.005 |

\* cited by examiner

METHODS AND APPARATUS FOR MANAGEMENT OF UNCONSCIOUSLY CAPTURED DOCUMENTS

This is a continuation of application Ser. No. 09/571,163, filed on May 15, 2000, now U.S. Pat. No. 7,039,864 entitled "Method and Apparatuses for Management of Unconsciously Captured Documents," incorporated by reference herein and assigned to the corporate assignee of the present invention.

FIELD OF THE INVENTION

The invention relates to data processing. More specifically, the invention relates to management and organization of electronic documents that have been unconsciously captured.

BACKGROUND OF THE INVENTION

The recent proliferation of digital communication networks, ranging from local area and wide area networks (LAN/WAN) to personal home networks, has created a multitude of pathways through which electronic devices may communicate. The group of devices capable of being networked is no longer limited to just computers, but has expanded to include devices such as printers, copiers, and even facsimile machines to name just a few.

As the number of networked devices continues to grow, so too does the amount of data processed by these devices. It is not uncommon for individuals in an office setting to send and receive large amounts of data in both electronic and printed formats daily.

A large percentage of the data sent and received by individuals tends to be in the form of electronic mail (email). Typically, when an individual receives email they read it and then choose to either save a copy of the message or delete it. Often, individuals will read a particular piece of email and subsequently delete it only to find at a later date that they should have saved the email. Similarly, individuals who save email messages may misplace one or more messages over a period of time. If the individual is located in an office that maintains a systems administrator, they may be able to have the message recovered or found. Unfortunately, however, it is difficult to identify a specific message once it is deleted and searching for a misplaced message can prove time consuming as well.

Electronic data including word processing files, spreadsheet files, and images are not immune to deletion or misplacement either. After creation, these types of files may be sent to another individual in electronic format, or more typically printed out. It is common for an individual working on a draft version of a file to print multiple versions of the file at various times. An individual may unwittingly delete an old version of a file only to discover that the saved version of the file is even older.

It is therefore desirable to have a system that manages electronic files and documents that originate from a variety of sources with reduced, or even minimized, user intervention and provides a straightforward interface for efficient electronic file retrieval. It is also desirable to provide a system for managing and organizing electronic documents in response to conditions that occur after the documents are originally stored.

SUMMARY OF THE INVENTION

Methods and apparatuses for electronic document management are described. A set of documents is unconsciously captured and stored according to a non-semantic organizational scheme. A search is performed to identify a subset of the electronic documents. The subset of electronic documents is replicated.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

Figure 1:
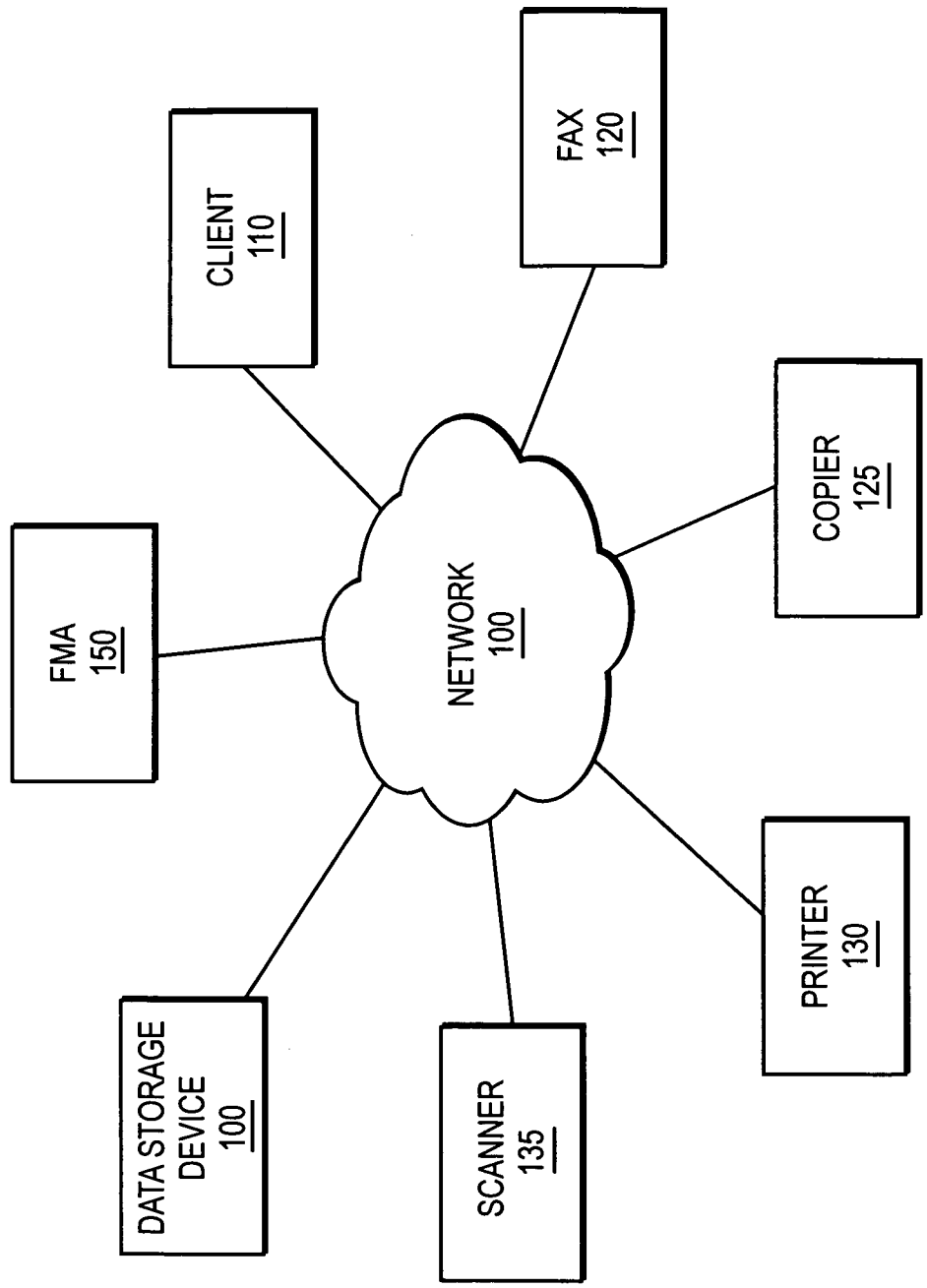
FIG. 1 illustrates one embodiment of a file management system.

Methods and apparatuses for managing unconsciously captured documents is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Methods and apparatuses for management of unconsciously captured documents are described. Various documents generated by networked devices are unconsciously captured and stored according to a non-semantic organization. The unconsciously captured documents are archived for possible search and retrieval at a later time. When an event occurs (e.g., lawsuit, audit, change in ownership) that results in a desire for a particular subset of the unconsciously captured documents, the documents are searched for a relevant subset. The subset of documents identified by the search are replicated. In one embodiment the replicated documents are stored according to a second organization (e.g., subject matter, particular audit). In one embodiment, subsequent unconsciously captured documents are stored according to the first organization. If the subsequent documents satisfy the criteria for the subset of documents, the subsequent documents are copied and stored according to a second organization.

System Overview

FIG. 1 illustrates one embodiment of a file management system. Client 110 represents a general purpose digital computer coupled to network 100. Network 100 may represent a local area network (LAN), an intranet, the Internet, or any other interconnected data path across which multiple devices may communicate. Also connected to network 100 is facsimile machine 120, copier 125, printer 130, scanner 135, data storage device 140, server 145, and file management appliance ("FMA") 150.

Facsimile machine 120 is connected to network 100 and represents a device capable of transmitting and receiving data such as text and images over a telephone or other communications line ("faxing"). In one embodiment, facsimile machine 120 may transmit text and images originating in printed form or, in another embodiment, facsimile machine 120 may transmit electronic data originating from any number of devices connected to network 100. Similarly, in one embodiment, facsimile machine 120 may print a hard copy of the received data, or in another embodiment, facsimile machine 120 may forward the received data to any number of devices connected to network 100.

Copier 125 represents a device capable of reproducing text and images. In one embodiment, copier 125 is a photocopier that reproduces printed text and images, whereas in another embodiment copier 125 is a photocopier that reproduces data received from any number of devices connected to network 100.

Printer 130 represents a device capable of converting electronic data into printed text and images, whereas scanner 135 represents a device capable of converting printed text and images into electronic data. In one embodiment, facsimile machine 120, photocopier 125, printer 130, and scanner 135 are each separate and distinct devices connected to network 100. In another embodiment, a multifunction device may replace any combination of these devices. Any number of devices may be omitted from or added to network 100 without parting from the spirit and scope of the present invention.

In one embodiment, data storage device 140 is also coupled to network 100. In one embodiment, data storage device 140 represents a removable storage medium such as a CD-ROM, DVD-ROM, DVD-RAM, DVD-RW, magnetic tape or other storage medium. In an alternative embodiment, data storage device 140 represents a non-removable storage medium such as a hard or fixed disk drive. In one embodiment, data storage device 140 is an archiving device.

Server 145 represents a general purpose digital computer connected to network 100 and is configured to provide network services to other devices connected to network 100. In one embodiment, server 145 provides file sharing and printer services to network 100. In another embodiment, server 145 is a Web server that provides requested hypertext markup language (HTML) pages or files over network 100 to requesting devices. In yet another embodiment, server 145 is a server capable of providing configuration services to network 100.

FMA 150 is a file management appliance that is connected to network 100. In one embodiment FMA 150 provides document capture and indexing services. In one embodiment, FMA 150 is a device capable of providing configuration services in addition to document capture and indexing services to network 100. In one embodiment, FMA 150 is not directly connected to any device, but rather is communicatively coupled to other devices through network 100. FMA 150 is capable of publishing its presence to other devices on network 100 using the HTTP or other protocols.

Automatic document capture (or "unconscious capture"), which is discussed more fully below, is the process by which one device, requests an archiving device, such as data storage device 140, to archive a document. In one embodiment, FMA 150 is the requesting device; however, other devices can also request archival of documents. Greater detail with respect to capture of documents that are copied, faxed, printed and other documents as well as document management are disclosed in U.S. Pat. No. 5,978,477 entitled "AUTOMATIC AND TRANSPARENT DOCUMENT ARCHIVING" issued Nov. 2, 1999, which is incorporated by reference and assigned to the corporate assignee of the present U.S. patent application.

A document may be composed of many distinct files of varying types, each representing at least the partial content of the document. A print job created on client 110 and intended for printer 130 could be captured, for example, as a thumbnail image, a postscript file, a portable document format (PDF) file, and an ASCII file containing extracted text. Additionally, FMA 150 is able to process multiple image file formats including the joint photographic experts group format (JPEG), graphics interchange format (GIF), and tagged image file format (TIFF) to name just a few. In one embodiment, each unique file type is represented by a corresponding unique file extension appended to the file's name. For example, a portable document format file may be represented as: filename.pdf, whereas a thumbnail image may be represented as: filename.thumb.

In one embodiment, FMA 150 is able to interpret compound filename extensions. For example, a thumbnail image file that contains images in a tagged image file format may be represented as filename.thumb.tiff. In one embodiment, FMA 150 uses the page number of the document as the filename. In such a manner, a document may be represented by multiple files located in the same directory, each representing a different page of the document as reflected by the filename. For example, "01.thumb.jpg" would represent a thumbnail image of page one in joint photographic experts group format. Similarly, "12.thumb.tiff" would represent a thumbnail image of page twelve in tagged image file format.

FMA 150 may index data captured from various devices connected to network 100 including printer 130, facsimile machine 120, client 110 and scanner 135. In one embodiment, facsimile machine 120 captures data over a telephone line and subsequently sends at least part of the received data to FMA 150 over network 100. In another embodiment, data sent from client 110 to facsimile machine 120 over network 100 is transparently (e.g. unbeknownst to the device) captured and at least part of the data is routed to FMA 150 for indexing.

In an alternative embodiment, facsimile machine 120 is located internal to client 110 thereby eliminating the need for client 110 to send data over network 100. In such an embodiment, FMA 150 nonetheless receives at least part of the captured data. In one embodiment, FMA 150 receives bibliographic-type data extracted from the document. In one embodiment, data received from facsimile machine 120 is composed in TIFF format, whereas data received from client 110 may retain its original format upon transfer.

The FMA capture process similarly applies to other devices connected to network 100 such as scanner 135 and copier 125. In one embodiment, if optical character recognition ("OCR") is performed on a scanned or copied document, FMA 150 creates two special OCR-related files. In one embodiment, "contents.txt" and "contents.pdf" are created and used by FMA 150 to index the full text of the document and return page images as a document file respectively.

In one embodiment, FMA 150 is capable of providing the same functionality as any one or more of the devices on network 100 thereby eliminating the need for these additional specialized devices. In a preferred embodiment, however, FMA 150 is implemented as a thin server containing enough hardware and software to support document capture and indexing over network 100.

Unconscious Capture

Unconscious capture is an operation in which a device (e.g., FMA 150) requests an archiving device (e.g., data storage device 140) to archive a document. In general, unconscious capture refers to FMA 150, or other device, automatically capturing documents processed by network 100 or devices coupled to network 100 without user intervention. In one embodiment, a user can optionally prevent capture of one or more documents or modify which documents are automatically captured.

In one embodiment, documents that are unconsciously captured are stored in a "non-semantic" manner. In other words, the unconsciously captured documents are stored with sufficient identification that an operating system can identify individual files, but that to a human user have no particular organization. Non-semantic file indicators can include, for example, random numbers, numerical sequences indicating time, an offset value from a memory location.

Unconscious capture can be performed by any network entity or device. In one embodiment, unconscious capture utilizes standard Internet protocols and allows the capture of multiple files associated with a single document. In another embodiment, simultaneous capture of multiple documents is supported.

In one embodiment, a document is represented by a directory containing one metadata file and at least one data file. The actual name of the document directory is not important during unconscious capture as the name of the document is not stored as part of the directory system, but is instead stored within the metadata file. In one embodiment, the name of the document is stored in the metadata file using a document serial number. In one embodiment, the capture date is used for the name of the document directory.

In one embodiment, the capture protocol is an implementation of the Internet File Transfer Protocol (FTP). In one embodiment, documents are captured either as multipurpose Internet mail extension (MIME) files in the default FTP directory, or as subdirectories of the default directory. Other capture formats can also be used.

Figure 2A:
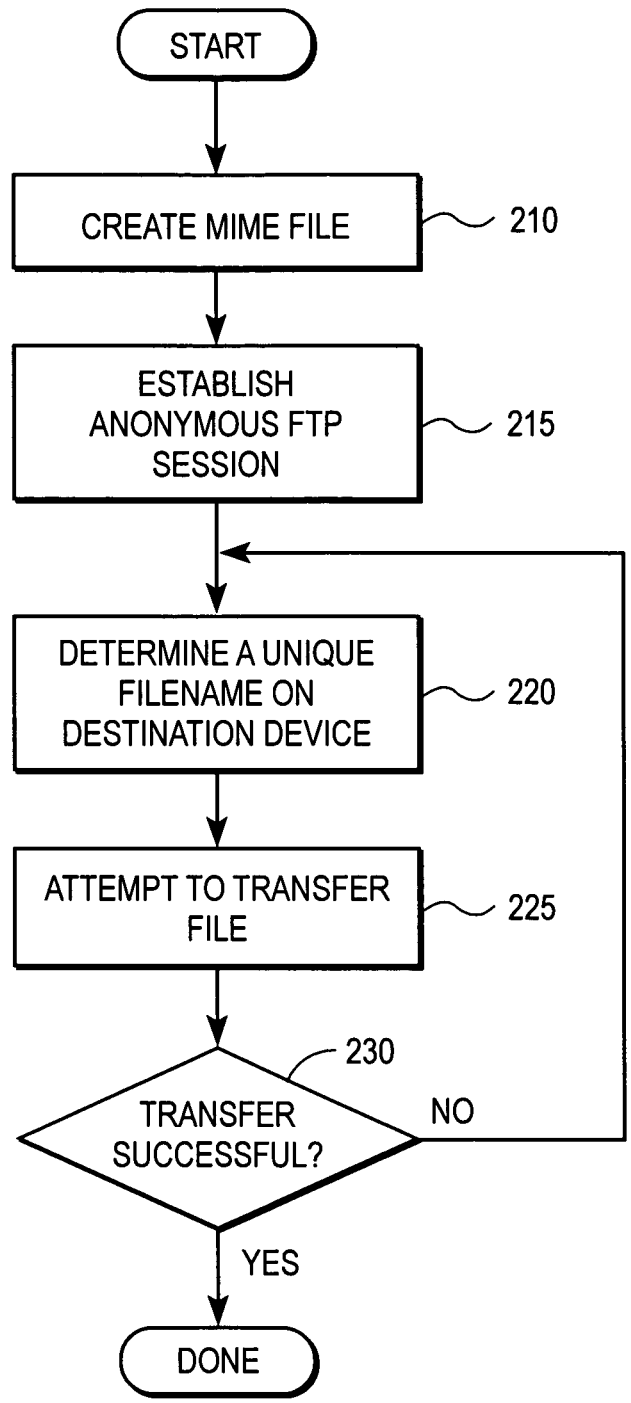
FIG. 2A illustrates one embodiment of unconscious capture using the MIME format.

FIG. 2A illustrates one embodiment of unconscious capture using the MIME format. A capturing device creates a MIME multi-part file, including all content files and a metadata file, 210. The capturing device then attempts to establish an anonymous FTP session with the destination device, 215. Once an FTP session is established, the capturing device determines a filename that is a unique on the destination device, 220 and attempts to transfer the file to the destination device, 225. If the transfer fails, the capturing device obtains a new filename and attempts the file transfer again. The capture is complete upon a successful file transfer, 230.

Figure 2B:
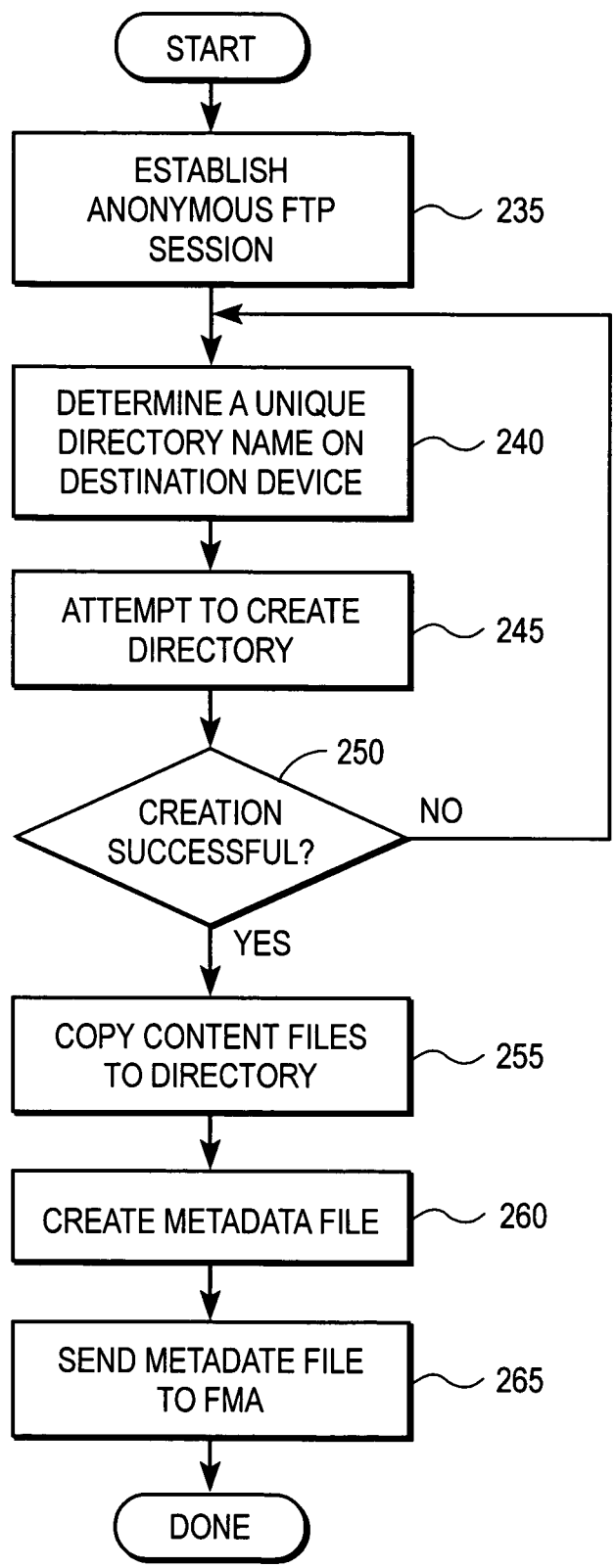
FIG. 2B illustrates one embodiment of unconscious capture in an FMA environment.

FIG. 2B illustrates one embodiment of unconscious capture in an FMA environment. The capturing device establishes an anonymous FTP session with the destination device, 235. Once the FTP session is established, the capturing device determines what it assumes to be a unique directory name on the destination device, 240. Once a directory name is determined, the capturing device attempts to create a directory with that name on the destination device, 245. If the attempt to create the directory is unsuccessful, whether due to a duplicate directory name or otherwise, the capturing device determines another directory name and attempts to create the directory again.

If, however, the capturing device successfully creates the directory on the destination device, 250, the capturing device then copies the content file or files to the newly created directory, 255. The capturing device also creates a metadata file, 260, which is then sent to the FMA device, 265 to complete the process.

Overview of a FMA

Figure 3:
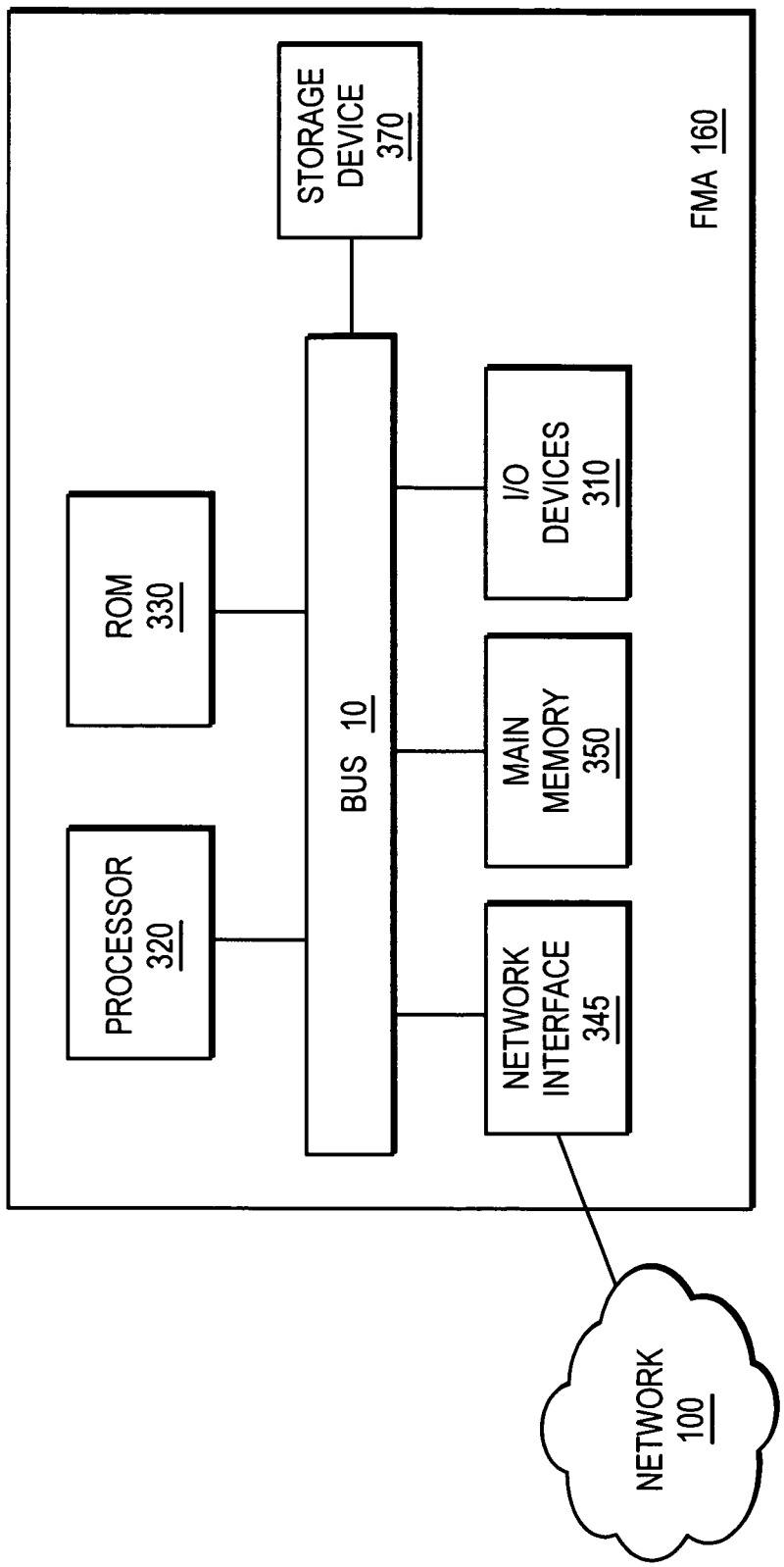
FIG. 3 illustrates one embodiment of a block diagram of a file management appliance.

FIG. 3 illustrates one embodiment of a block diagram of a file management appliance. FMA 160 includes bus 310 or other communication device to communicate information, and processor 320 coupled to bus 310 to process information. While FMA 160 is illustrated with a single processor, FMA 160 can include multiple processors and/or co-processors. FMA 160 further includes random access memory (RAM) or other dynamic storage device 350 (referred to as main memory), coupled to bus 310 to store information and instructions to be executed by processor 320. Main memory 350 also can be used to store temporary variables or other intermediate information during execution of instructions by processor 320.

FMA 160 also includes read only memory (ROM) and/or other static storage device 330 coupled to bus 310 to store static information and instructions for processor 320. Storage device 370 is coupled to bus 310 to store information and instructions. Storage device 370 such as a magnetic disk or optical disc and corresponding drive can be coupled to FMA 160.

FMA 160 can also be coupled via bus 310 to I/O devices 360, such as a cathode ray tube (CRT) or liquid crystal display (LCD), to display information to a user, and alphanumeric input device to communicate information and command selections to processor 320. Another type of I/O device is a cursor control, such as a mouse, a trackball, or cursor direction keys to communicate direction information and command selections to processor 320 and to control cursor movement on the display. Additional and/or different I/O devices can also be coupled to bus 310.

Network interface 345 provides an interface between FMA 160 and network 100. In one embodiment, network interface 345 is a network interface card (NIC), which are known in the art; however, any interface that can provide FMA 160 with access to networks can be used.

According to one embodiment, the searches are performed by FMA 160 in response to processor 320 executing sequences of instructions contained in main memory 350. Instructions are provided to main memory 350 from a storage device, such as magnetic disk, a read-only memory (ROM) integrated circuit (IC), CD-ROM, DVD, via a remote connection (e.g., over a network), etc. In alternative embodiments, hard-wired circuitry can be used in place of or in combination with software instructions to implement the present invention. Thus, the present invention is not limited to any specific combination of hardware circuitry and software instructions.

In one embodiment, FMA 160 performs searches on documents that are stored according to a non-semantic organizational scheme. The documents that match the search criteria are stored, or copied and stored, according to a second organizational scheme (e.g., by subject matter, by title, by date). Thus, the organizational scheme used for electronic documents can be determined after the documents are created and/or in response to a new situation that requires or suggests a specific organizational scheme.

Document Management

Figure 4:
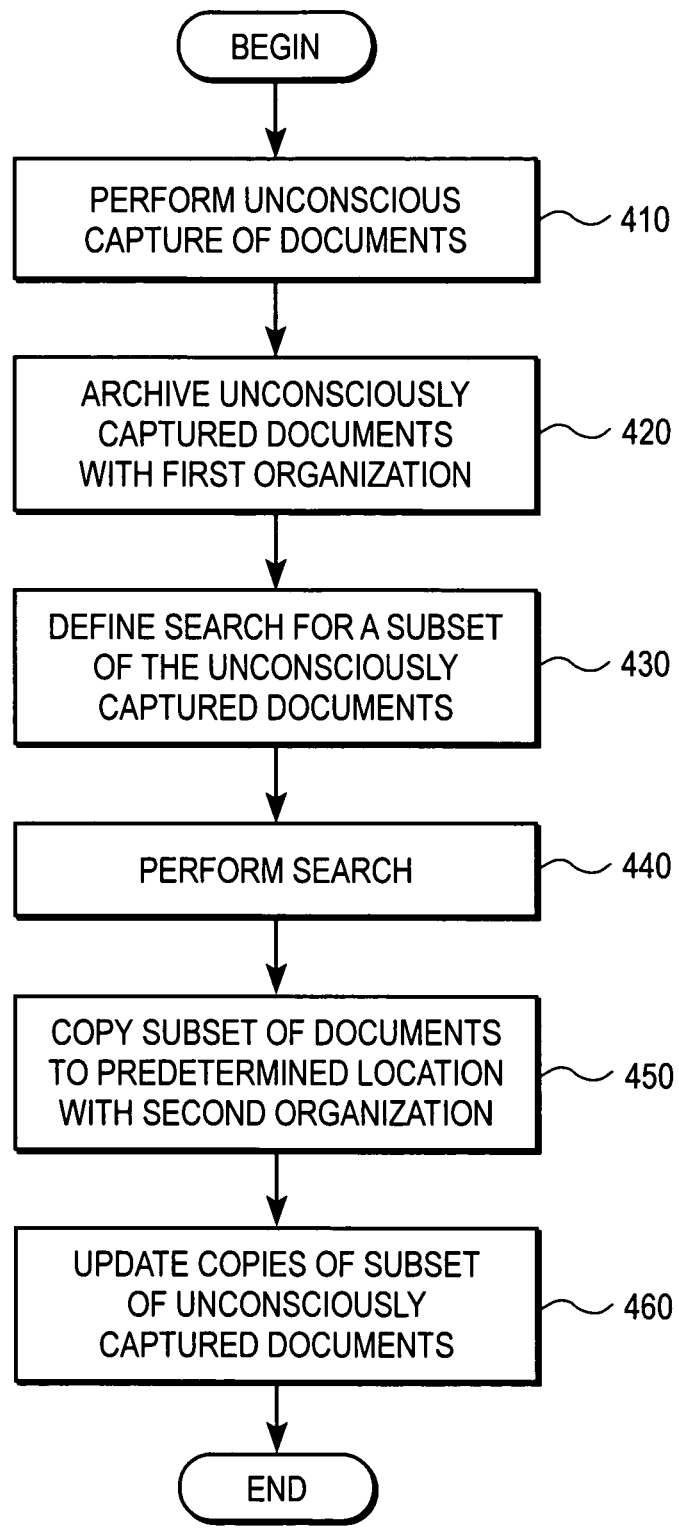
FIG. 4 is a flow diagram of one embodiment of management of unconsciously captured documents.

FIG. 4 is a flow diagram of one embodiment of management of unconsciously captured documents. Documents are unconsciously captured at 410. Unconscious capture of documents is performed as described above. In one embodiment, all documents processed by devices coupled to a network are unconsciously captured and stored by a storage device according to a non-semantic organization.

Typically, the organization of the unconsciously captured documents is unknown to the various users because different users generate and/or process document for different purposes. In one embodiment, as described above, the unconsciously captured documents are stored according to a non-semantic organization. Because different users have different purposes a single organizational scheme is not likely to be useful for all users. Therefore, the unconsciously captured documents are stored in a manner unrelated to the subject matter and/or purpose of the respective documents.

The unconsciously captured documents are archived at 420. In one embodiment, the unconsciously captured documents are periodically (e.g., hourly, daily, weekly) copied to one or more predetermined storage devices for archival. The archived documents are available for search and retrieval by one or more of the networked devices. In one embodiment, archival services are provided by an organization other than the organization controlling the network devices.

A search is defined for a subset of the unconsciously captured documents at 430. The search can be based on any type of criteria, for example, subject matter, date, title, keyword, author, document type, document source. The search criteria can be defined in any manner known in the art.

The search is performed at 440. The search can be performed in any manner known in the art. The search results can be displayed to the requestor or the search results can be automatically processed. The search results can be presented and processed in any manner known in the art.

The subset of documents identified by the search are replicated to a predetermined location at 450. The search requestor can identify the predetermined location before, after or during the search. In one embodiment, the subset of documents identified by the search are stored in a non-semantic manner to be organized at a later time. In alternative embodiments, the subset of documents are stored according to an organizational scheme based on the search criteria.

For example, if all documents related to a particular meeting were identified by the search, the resulting documents would be stored in some manner that identifies the documents as being related to the meeting, for example, a directory or folder having a title corresponding to the meeting can be generated for storing the documents identified by the search. The subset of documents can also be organized by a party performing the search.

In one embodiment, replication is accomplished by use of a network protocol. Some protocols that can be used include Hypertext Transfer Protocol (HTTP) or File Transfer Protocol (FTP). Other network protocols can also be used.

In one embodiment, the subset of documents can be stored according to an organization that is determined automatically based on the organization of a predetermined set of documents. For example, the documents can be organized as described in U.S. patent application Ser. No. 09/163,848 filed Sep. 30, 1998, entitled "AUTOMATIC DOCUMENT CLASSIFICATION USING TEXT AND IMAGES," which is assigned to the corporate assignee of the present invention and incorporated by reference herein. Other organization schemes can also be used.

In one embodiment, an independent organization can provide archival services for the replicated documents, or for transfer of the replicated documents. In one embodiment, the FMA replicates the documents identified by the search to a remote storage device based upon access terms negotiated between two organizations (e.g., an organization generating the documents and an organization storing the replicated documents). The phrase "access terms" is used herein to describe conditions according to which the client may be subject to in order to access a network-based application. "Access terms" include and/or are used synonymously with lease terms, license terms, usage terms and the like. The network-based application access terms may be negotiated "in person" between the two organizations, or alternatively the access terms may be negotiated automatically between the FMA and remote server.

Access to one or more archived documents may be limited by a number of concurrent accesses as well as an upper bound on the number of times the documents may be accessed. For example, one license agreement may stipulate access terms that limit access to 5 concurrent client accesses, whereas a second license agreement may stipulate application access terms that limit access to 5 total executions regardless of when they occur. The FMA may track access privileges through the use of a lookup table for example, which may or may not be encrypted.

Future documents that are unconsciously captured can be stored in a similar manner at 460. That is, all documents that are unconsciously captured are stored according to the first organizational scheme with the other documents that are generally unconsciously captured. Copies of the documents related to a search criteria (e.g., the meeting) can also be stored with the copies of the documents identified by the search. If so, the copies of the subset of documents are updated at 470.

If future electronic documents are stored based on the search criteria. One of several storage options can be used. For example, the future documents can be stored with the more general set of unconsciously captured documents as well as the subset of documents. The future documents can be stored with the subset of documents only. The future documents can be stored in a predetermined manner so that they can be reviewed to determine whether one or more of the future documents should be stored with the subset of documents.

The subset of documents can be a copy of the relevant documents from the set of documents so that two copies are maintained, one for the larger set of documents and one for the subset of documents. Alternatively, the subset of documents can be the only copy of the particular document.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
    capturing one or more images of physical documents at a first device without user intervention;
    transmitting the captured images to an outside device for archiving, in a non-semantic organization, over a network without user intervention;
    defining a search for a subset of captured images that have been archived by the outside device without user intervention;
    performing the defined search at the first device; and
    in response to the defined search being performed,
        determining, prior to replication of captured images to a predetermined location, whether replication of captured images identified by the search satisfy one or more negotiated access terms exchanged between the first device and the outside device that define one or more usage conditions to which the first device is subjected, wherein the negotiated one or more access terms are associated with a plurality of users including a user of the first device, and comprise a maximum number of times a document may be accessed by the plurality of users and a maximum number of concurrent accesses to the document by the plurality of users, and
        generating copies of a subset of captured images identified by the search after determination that the negotiated access terms are satisfied, wherein the generated copies are for transfer to, and storage in, a file system at the predetermined location based on the negotiated access terms,
    wherein the subset of captured images are transmitted over the network to the predetermined location, the predetermined location being a remote device different from the outside device and the first device,
    wherein the copies of the subset of captured images identified by the search are transferred to, and stored at, the file system at the predetermined location in a folder identified by one or more criteria of the defined search.

2. The method of claim 1, wherein the non-semantic organization stores a captured image in an organization unrelated to the subject matter or purpose of a corresponding physical image.

3. The method of claim 1, wherein the one or more images are captured at a first device, the transmitting further comprising:
    storing a group of images captured by the first device; and
    periodically transmitting the group of images to the outside device for archiving.

4. The method of claim 1, wherein the captured images are available for search and retrieval after archiving by the outside device.

5. The method of claim 1, wherein the replicated subset of captured images identified by the search are stored at the predetermined location in a non-semantic organization to be organized at a later time.

6. The method of claim 1, wherein the search is defined based on one or more of a subject matter, a date, a title, a keyword, an author, a document types, and a document source.

7. The method of claim 1, wherein the captured images archived in the non-semantic organization are stored using non-semantic file indicators with sufficient information that an operating system can identify individual files of the unconsciously captured electronic documents, and wherein the non-semantic file indicators do not provide a particular organization of the electronic documents to a user.

8. The method of claim 7, wherein at least one non-semantic file indicator comprises a combination of at least two of a random number, a numerical sequence indicating a time, and an offset value from a memory location where a corresponding captured image is located.

9. The method of claim 1, wherein at least one captured image of a physical document includes a plurality of image files corresponding to individual pages of the physical document and a single text file corresponding to contents of the plurality of image files of the physical document, further comprises:
    generating, at the first device, an index of the physical document from the single text file; and
    transmitting the plurality of image files corresponding to individual pages of the physical document with the index to the outside device for archiving of the physical document to enable a search of text of the physical document and return of a subset of image files corresponding to a subset of pages of the physical document in response to the search of the text of the physical document.

10. The method of claim 1, further comprising:
    archiving a new document, captured without user intervention, in the non-semantic organization after the defined search is performed;
    determining that the new document is related to one or more criteria defined by the search; and updating the subset of captured images identified by the search with the new document.

11. The method of claim 10, wherein updating the subset of capture images identified by the search with the new document further comprises:
storing a copy of the new document with the copies of the subset of captured images identified by the search.

12. The method of claim 10, wherein updating the subset of capture images identified by the search with the new document further comprises:
storing a copy of the new document for review by a user to determine whether the new document is to be stored with the copies of the subset of captured images identified by the search.

13. An apparatus comprising:
a memory to store images of physical documents; and
a processor coupled with the memory to execute instructions to
capture one or more images of physical documents without user intervention,
transmit the captured images to an outside device for archiving, in a non-semantic organization, over a network without user intervention, and
define a search for a subset of captured images that have been archived by the outside device without user intervention,
perform the defined search, and
in response to the defined search being performed, determine, prior to replication of captured images to a predetermined location, whether replication of captured images identified by the search satisfy one or more negotiated access terms exchanged with the outside device that define one or more usage conditions to which the apparatus is subjected, wherein the negotiated one or more access terms are associated with a plurality of users including a user of the apparatus, and comprise a maximum number of times a document may be accessed by the plurality of users and a maximum number of concurrent accesses to the document by the plurality of users, and
generate copies of a subset of captured images identified by the search after determination that the negotiated access terms are satisfied, wherein the generated copies are for transfer to, and storage in, a file system at the predetermined location based on the negotiated access terms, wherein the subset of captured images are transmitted over the network to the predetermined location, the predetermined location being a remote device different from the outside device, and wherein the copies of the subset of captured images identified by the search are transferred to, and stored at, the file system at the predetermined location in a folder identified by one or more criteria of the defined search.

14. The apparatus of claim 13, wherein the non-semantic organization stores a captured image in an organization unrelated to the subject matter or purpose of a corresponding physical image.

15. The apparatus of claim 13, wherein the processor executes instructions further comprising:
to store a group of captured images, and periodically transmit the group of captured images to the outside device for archiving.

16. The apparatus of claim 13, wherein the search is defined based on one or more of a subject matter, a date, a title, a keyword, an author, a document types, and a document source.

17. The apparatus of claim 13, wherein the captured images archived in the non-semantic organization are stored using non-semantic file indicators with sufficient information that an operating system can identify individual files of the unconsciously captured electronic documents, and wherein the non-semantic file indicators do not provide a particular organization of the electronic documents to a user.

18. The apparatus of claim 13, wherein at least one non-semantic file indicator comprises a combination of at least two of a random number, a numerical sequence indicating a time, and an offset value from a memory location where a corresponding captured image is located.

19. A non-transitory computer readable storage medium that provides instructions, which when executed on a processing system, cause said processing system to perform a method comprising:
capturing one or more images of physical documents at a first device without user intervention;
transmitting the captured images to an outside device for archiving, in a non-semantic organization, over a network without user intervention;
defining a search for a subset of captured images that have been archived by the outside device without user intervention;
performing the defined search at the first device; and
in response to the defined search being performed,
determining, prior to replication of captured images to a predetermined location, whether replication of captured images identified by the search satisfy one or more negotiated access terms exchanged between the first device and the outside device that define one or more usage conditions to which the first device is subjected, wherein the negotiated one or more access terms are associated with a plurality of users including a user of the first device, and comprise a maximum number of times a document may be accessed by the plurality of users and a maximum number of concurrent accesses to the document by the plurality of users, and
generating copies of a subset of captured images identified by the search after determination that the negotiated access terms are satisfied, wherein the generated copies are for transfer to, and storage in, a file system at the predetermined location based on the negotiated access terms,
wherein the subset of captured images are transmitted over the network to the predetermined location, the predetermined location being a remote device different from the outside device and the first device, wherein the copies of the subset of captured images identified by the search are transferred to, and stored at, the file system at the predetermined location in a folder identified by one or more criteria of the defined search.

20. The computer readable storage medium of claim 19, wherein the captured images archived in the non-semantic organization are stored using non-semantic file indicators with sufficient information that an operating system can identify individual files of the unconsciously captured electronic documents, and wherein the non-semantic file indicators do not provide a particular organization of the electronic documents to a user.

* * * * *